United States Patent [19]

Chen

[11] Patent Number: 5,108,157
[45] Date of Patent: Apr. 28, 1992

[54] WHEEL COVER ASSEMBLY
[75] Inventor: Chao-Chin Chen, Tainan, Taiwan
[73] Assignee: Henka Electronic & Electric Man. Corp., Tainan, Taiwan
[21] Appl. No.: 639,340
[22] Filed: Jan. 10, 1991
[51] Int. Cl.⁵ .............................................. B60B 7/12
[52] U.S. Cl. ................................. 301/37P; 301/37 R
[58] Field of Search ............... 301/37 R, 37 P, 37 PB, 301/37 TP

[56] References Cited
FOREIGN PATENT DOCUMENTS

| 3809480 | 10/1989 | Fed. Rep. of Germany .... | 301/37 PB |
| 0134303 | 6/1988 | Japan ................................ | 301/37 R |
| 0190501 | 7/1989 | Japan ................................ | 301/37 P |

Primary Examiner—Russell D. Stormer
Attorney, Agent, or Firm—Morton J. Rosenberg; David I. Klein

[57] ABSTRACT

A wheel cover assembly includes a cover body having a base circular support integrally formed along the circumferential surface adjacent to the edge portion on the inverse side, a plurality of lock openings spaced along the circumference of the base circular support and divergent radially, a plurality of lock devices pivotably secured in the lock openings for actuating between a packing position for minimizing the packing size thereof and an assembled position for receiving and engaging a circular retaining ring so as to connect the assembly to a wheel rim of a tire.

4 Claims, 7 Drawing Sheets

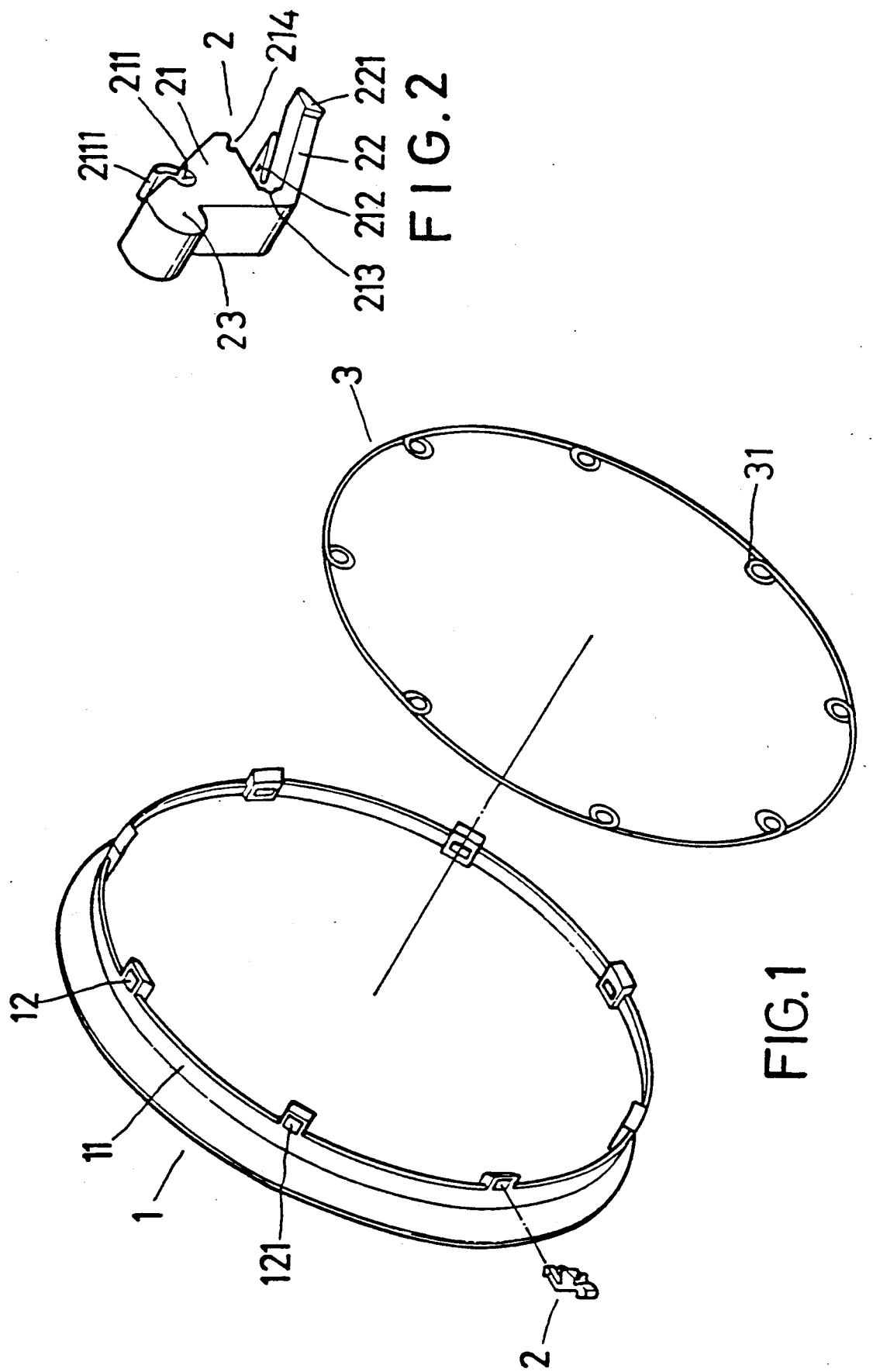

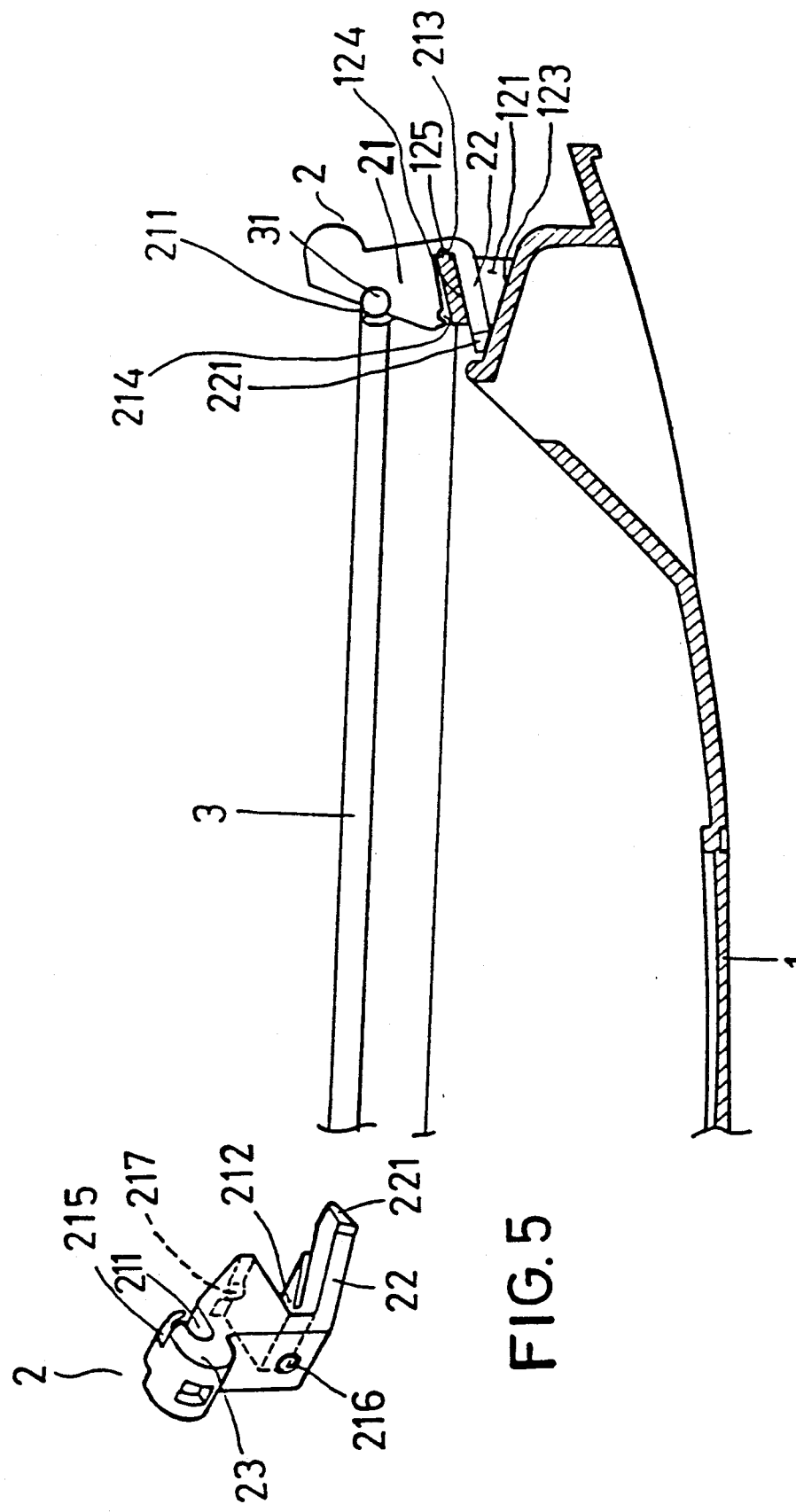

WHEEL COVER ASSEMBLY

BACKGROUND OF THE INVENTION

The present invention relates to a wheel cover assembly which is designed for minimizing package size and facilitating the connecting and disconnecting operations.

Wheel cover assembly which covers a wheel rim and its fasteners of a tire have been known heretofore, as shown in U.S. Pat. No. 4,596,425 to Hung. Such wheel cover assembly includes a cover body having a base circular support integrally formed along the circumferential surface adjacent to the edge portion on the inverse side, a plurality of lock openings spacingly provided on the outer wall of the base circular support, a plurality of lock devices detachably secured in the lock openings and a circular retaining ring coupled with the lock devices.

The cover body, lock devices and the circular retaining member of the known wheel cover assembly are not assembled but packed together as a single unit for the convenience of packing and transportation so that package size can be minimized and transportation cost can be reduced. Said package contains a plurality of small parts such as lock devices and screws which, as found, are easy to get lost when transporting or stocking. Moreover, connecting and disconnecting the known wheel cover assembly are inconvenient and labor consuming as all the lock devices have to be fixed to or replaced from the lock openings one after another. Proper tools such as screw driver are essential during connection and disconnection operations.

SUMMARY OF THE INVENTION

It is therefore a primary object of the present invention to provide an improved wheel cover assembly that overcomes the foregoing problems associated with the prior art.

According to the present invention, this and other objects are achieved by providing a wheel cover assembly which comprises a cover body having a base circular support integrally formed along the circumferential surface adjacent to the edge portion on the inverse side, a plurality of lock openings spaced along the circumference of the base circular support and divergent radially, lock means comprising a plurality of lock support members pivotably secured in the lock openings for actuating between a packing position for minimizing the packing size thereof and an assembled position for receiving and engaging a circular retaining ring so as to connect the assembly to a wheel rim of a tire.

BRIEF DESCRIPTION OF THE DRAWINGS

FIG. 1 is an exploded perspective view of a preferred embodiment of a wheel cover assembly according to the present invention;

FIG. 2 is a perspective view of a lock support member to be used in the wheel cover assembly of the present invention;

FIG. 4 is a sectional view of the lock support member which is in assembled state;

FIG. 5 is a perspective view of a modified example of the lock support member according to the present invention;

FIG. 7A is a sectional view of a modified lock support member to be used in the second embodiment of the present invention shown in FIG. 7;

DETAILED DESCRIPTION OF THE PREFERRED EMBODIMENTS

Figure 3:
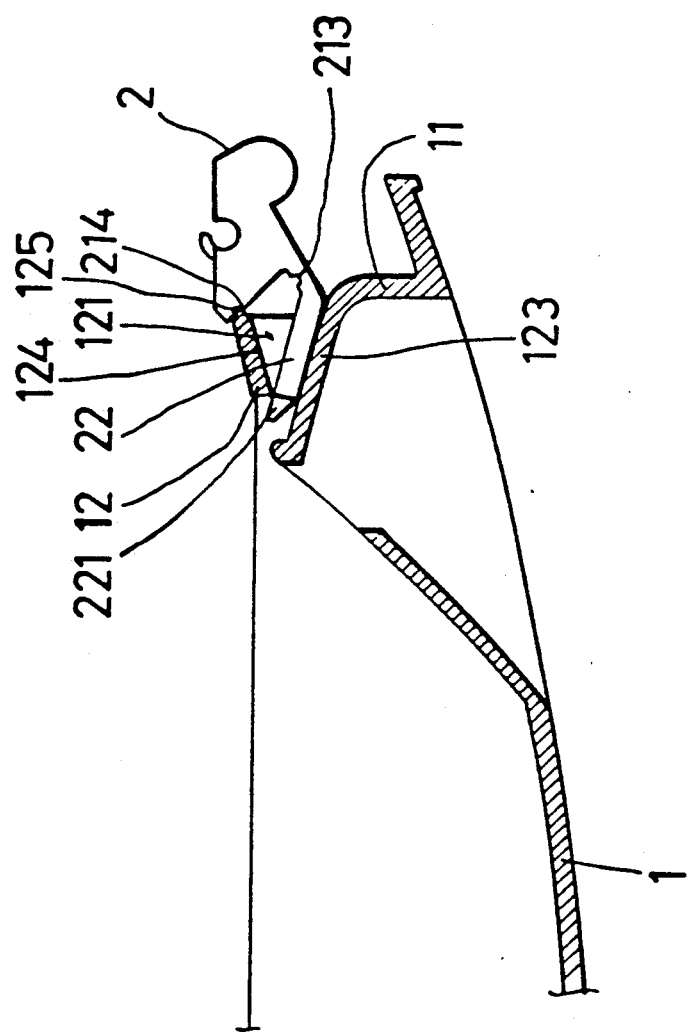
FIG. 3 is a sectional view of the lock support member which is in packing state.

Referring to FIG. 1, a preferred embodiment of an improved wheel cover assembly which comprises a cover body 1 having a base circular support 11 integrally formed on the inner circumferential surface thereof; a plurality of partition members 12 spacingly disposed on said base circular support 11, each having an opening therethrough to define openings 121 which extend radially and are divergent outwardly; lock means comprising a plurality of lock support members respectively secured in the partition members 12 and a circular retaining member 3 engaged with the lock support members 2.

Referring to FIG. 2, each lock support member 2 includes a connecting bend member 22 formed with a forked plug member at the lower end and a hook 2111 and a curling side 23 formed at the upper end, defining a horizontal groove 211 therein. The forked plug member has a tapered enlargement 221 at the free end thereof which is split longitudinally. The lock support member 2 is further provided with two engaging notches 213, 214 in the neck portion 212 and bottom of the lock support member 2 respectively.

Referring again to FIG. 1, the circular retaining member 3 includes a plurality of loop members 31 spacingly and integrally formed along the circumferential edge for resiliently fitting the member 3 into the grooves 211.

As shown in FIG. 3, each of the connecting bend members 22 of the lock support members 2 is respectively and pivotally fixed in the lock openings 121. The enlargement 221 is yieldable whereby it can be squeezed together when inserted through the lock opening 121 from the outer side and after passing therethrough can expand to provide the interlock between the partition member 12 of the base circular support 11 of the cover body 1 and the lock support member 2. As the lock opening 121 of the partition member is divergent substantially radially outwardly between the top wall 124 and bottom wall 123 thereof, the lock support member 2 thus secured is pivotable about the tapered enlargement 221 between a packing position and further locked in this position by engaging a projection 125, which is integrally formed on outer end of the top wall 124, in the notch 214, as shown in FIG. 3, and an assembled position and further locked in this position by engaging the projection 125 in another notch 213, as shown in FIG. 4.

Figure 6:
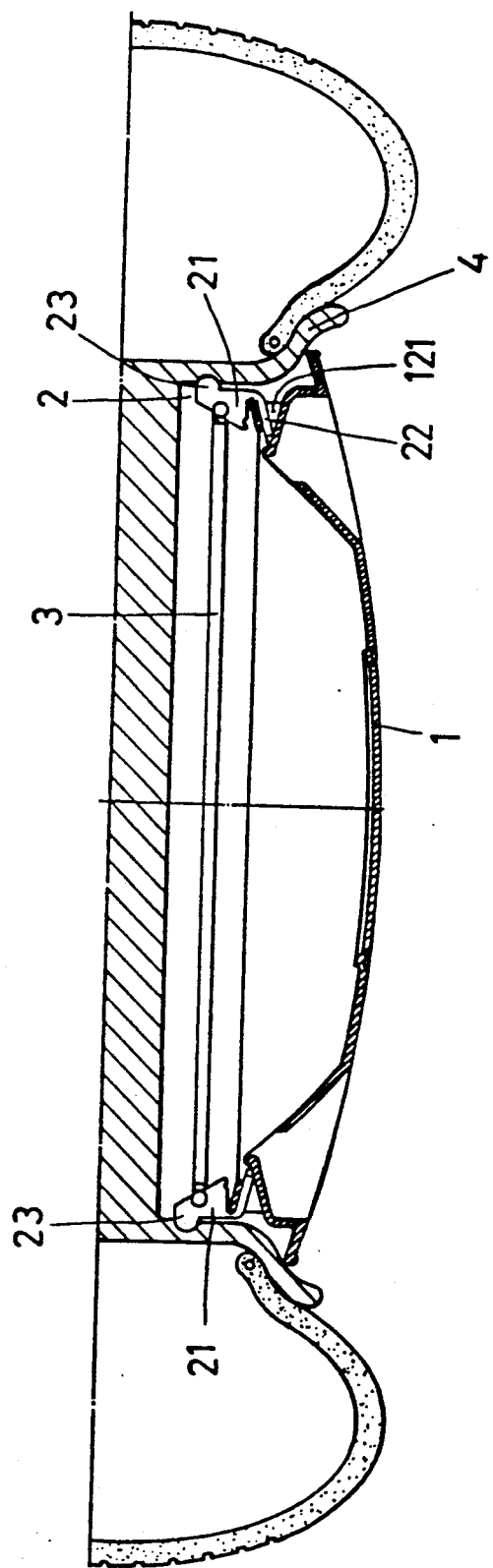
FIG. 6 is a sectional view of the wheel cover assembly of the present invention which is mounted on a tire.

In packing state, as best shown in FIG. 3, all the lock support members 2 are secured to the cover body 1 and disposed in packing position so that package size is minimized and transportation cost reduced. In assembled state, as best shown in FIGS. 4 & 6, the lock support members 2 are swung from packing position, whereas the connecting bend members 22 thereof abut the bottom wall 123 of the partition member of the cover body 1, into assembled position, whereas the connecting bend members 22 abut the top wall 124, and the loop members 31 of the circular retaining member 3 is then installed in the lock support members 2. The assembled cover body 1 is then connected to the wheel rim 4 by aligning the curling sides 23 with the hub edge and being pressed for making the engagement therewith. Since lock support members 2 is resilient, the connection is easy and the coupling condition between the wheel rim and the cover body 1 is tightly secured therewith.

Unlike the wheel cover disclosed by U.S. Pat. No. 4,596,425, the cover body 1, the lock support members 2 and the retaining ring 3 are assembled together as a single unit so that users need not to assemble this device by themselves and parts of this assembly may not get lost during its transportation.

Referring to FIG. 5, there is shown a modified example of the lock devices 2 whose connecting bend member 22, tapered and split enlargement 221 are identical with that of the lock support members 2 of the preferred embodiment shown in FIG. 2 except that a curling side 215 extend partially over the horizontal groove 211 for retaining the circular retaining ring 3 engaged in the groove 211 and concave recesses 216, 217 are formed in the neck portion 212 and front side of the curling body 23 for engaging the projection 125 respectively in packing position and assembled position.

Figure 7:
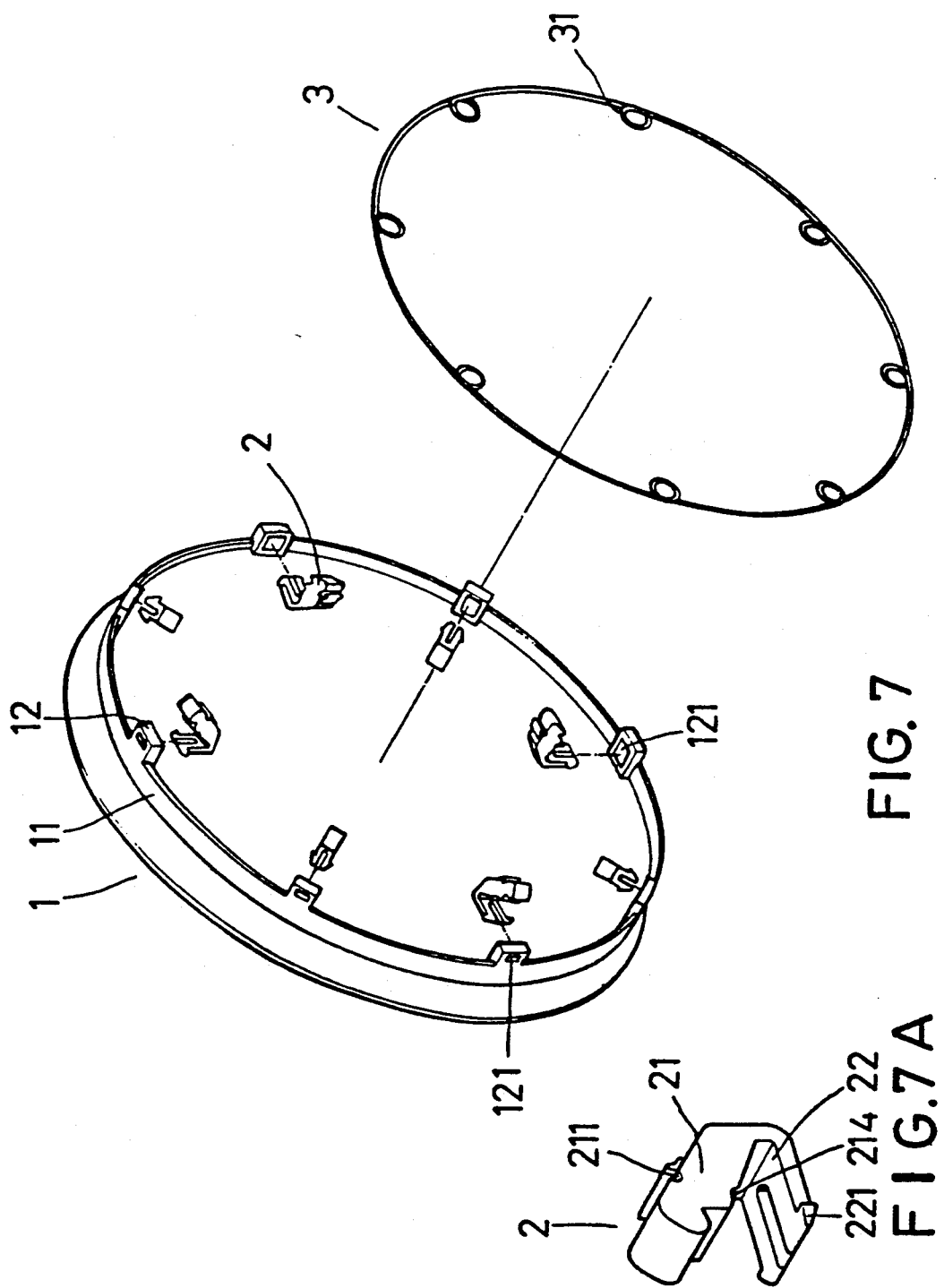
FIG. 7 is an exploded perspective view of a second embodiment according to the present invention.

FIGS. 7 to 10 show a second embodiment of the present invention. To facilitate understanding, the figures which follow the figures illustrating the first embodiment of the present invention of each reference numeral are identical when elements or members are denoted having the same or similar functions. Referring to FIG. 7, the cover body 1, the base circular support 11 and the circular retaining ring 3 having integral loops 31 are all identical with that of the first embodiment except that the lock openings 121 are divergent radially inwardly and all the lock devices are adapted to be secured to the cover body 1 by inserting into corresponding lock openings 121 from inner side.

Referring to FIG. 7A, the lock support member 2 of the second embodiment includes a connecting bend member 22 formed with a forked plug member at the lower end and a horizontal groove 211 formed at the upper end. The forked plug member has a tapered enlargement 221 at the free end thereof which is split longitudinally. The lock support member 2 is further provided with an engaging notch 214 in the bottom of the lock support 21.

Figure 8:
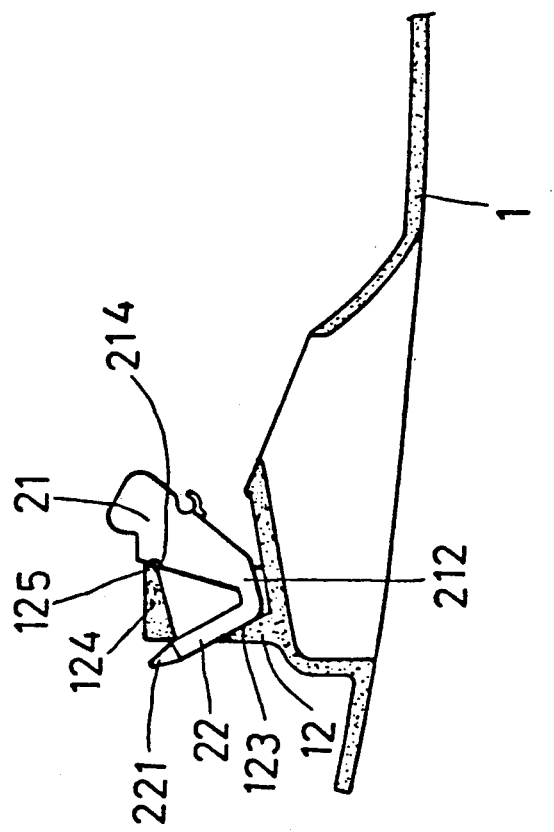
FIG. 8 is a sectional view of the second embodiment wherein the lock support member is in packing state.
Figure 9:
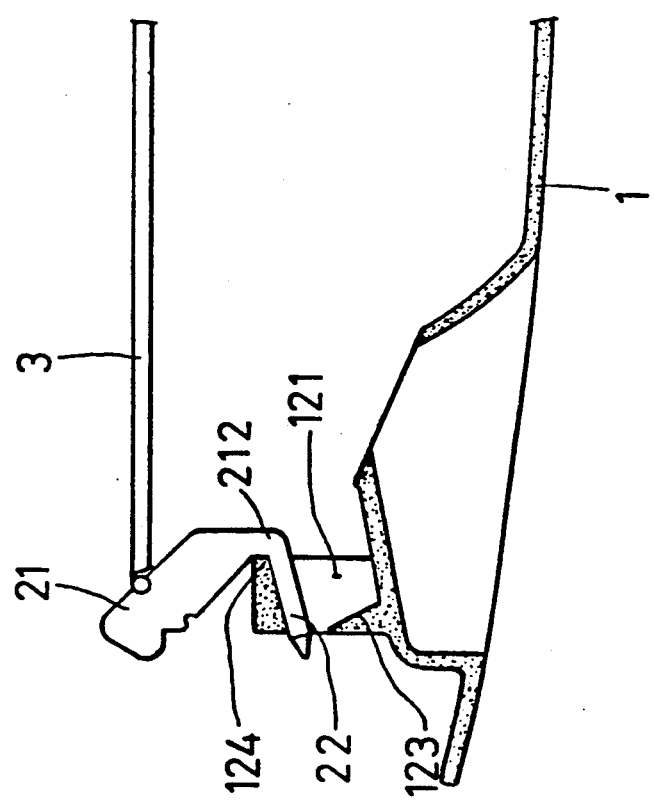
FIG. 9 is a sectional view of the second embodiment wherein the lock support member is in assembled state.

Referring to FIG. 8, each of the connecting bends 22 of the lock support members 2 is respectively and pivotably fixed in the lock openings 121 from inner side of the partition member 12 in a way similar to that of the lock devices 2 shown in the first embodiment. As the lock opening 121 of the partition member 12 is divergent substantially radially inwardly between a top wall 124 and a bottom wall 123 and further formed with a take-off portion therein substantially corresponding to the angle portion defined by the connecting bend member 22 and neck portion 212 of the lock support member 2, the lock support member 2 thus secured is pivotable about the tapered enlargement 221 between a packing position by resting the connecting bend member 22 on the slanting bottom wall 123 and further locking in this position by engaging a projection 125 in the notch 214, as best shown in FIG. 8, and an assembled position by abutting the connecting bend member 22 against the top wall 124, as best shown in FIG. 9.

Figure 10:
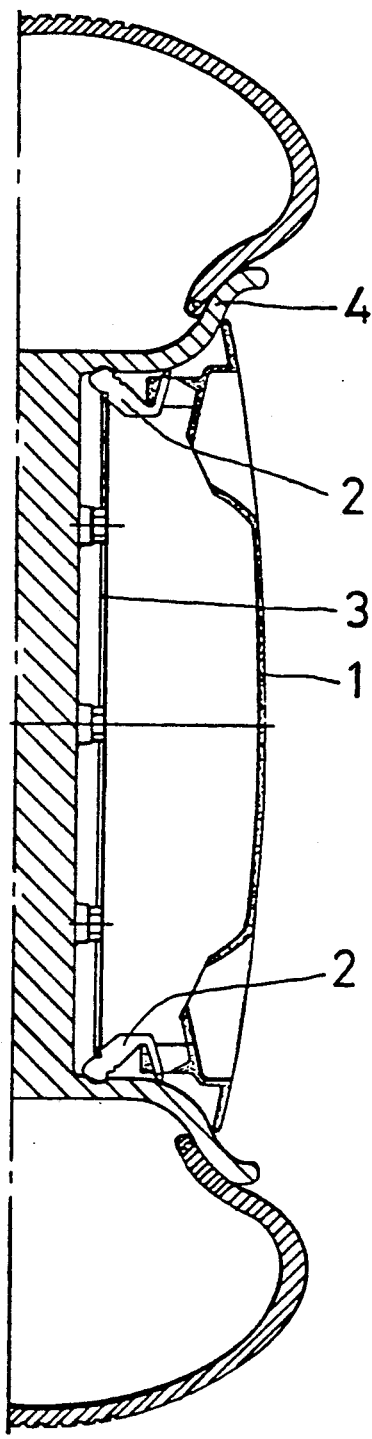
FIG. 10 is a sectional view of the wheel cover assembly of the second embodiment of the present invention which is mounted on a tire.

In packing state of this second embodiment, as best shown in FIG. 8, all of the lock support members 2 are secured to the cover body 1 and disposed in packing position so that packing size is minimized and transportation cost can be reduced. In assembled state, as best shown in FIGS. 9 and 10, the lock support members 2 are swung from packing position into assembled position and the circular retaining member 3 is installed in the lock support member by respectively engaging the protuberances 31 in the grooves 211. The assembled cover body 1 is then connected to the wheel rim 4 by press-fitting to make the engagement therewith.

I claim:

1. A wheel cover assembly comprising:
   (a) a cover body having a base circular support integrally formed on an inner circumferential surface thereof, and a plurality of partition members spacingly disposed on said base circular support, wherein each partition member has an opening therethrough to define a divergent lock opening extending radially;
   (b) lock means for connecting said cover body to a wheel, wherein said lock means includes a plurality of lock support members, each of said support members having a first end formed with a hook member to define a horizontal groove, a connecting bend member is integrally attached to a second end of said lock support member, said support member further including a forked plug member formed on a free end of said connecting bend member for being pivotally secured in said opening formed in said partition member; and,
   (c) a circular retaining member having a plurality of integral loop members spaced along a circumferential edge thereof for adjustment of a circumferential dimension of said circular retaining member for insert thereof into horizontal grooves of said lock supports, whereby said lock means is arranged to be actuated between a first portion with said first end of said lock support adjacent said cover body to minimize a dimensional extent of said wheel cover assembly, and a second position with said first end of said lock support raised from said cover body to receive and engage said circular retaining member.

2. A wheel cover assembly as recited in claim 1 wherein each lock opening is divergent radially outwardly and each forked plug member includes a tapered enlargement split longitudinally which is inserted into said lock opening from an inner side of said base circular support for pivotally interconnecting said lock device and said base circular support.

3. A wheel cover assembly as recited in claim 1 wherein each lock opening is divergent radially inwardly and said forked plug member has a tapered enlargement split longitudinally which is inserted into said lock opening from an inner side of said base circular support for pivotally interconnecting said lock device and said base circular support.

4. A wheel cover assembly as recited in claims 2 or 3 wherein said partition members, said lock devices, and said loop members are all in a one-to-one relationship.

* * * * *